(12) United States Patent
Petschik et al.

(10) Patent No.: US 6,921,893 B1
(45) Date of Patent: Jul. 26, 2005

(54) POSITION DETECTOR FOR A SCANNING DEVICE

(75) Inventors: Norbert Petschik, Isny (DE); Frank Burkhardt, Puchheim (DE)

(73) Assignee: Scanlab AG, Puchheim (DE)

( * ) Notice: Subject to any disclaimer, the term of this patent is extended or adjusted under 35 U.S.C. 154(b) by 294 days.

(21) Appl. No.: 10/276,518

(22) PCT Filed: Jun. 15, 2000

(86) PCT No.: PCT/EP00/05528

§ 371 (c)(1),
(2), (4) Date: Nov. 15, 2002

(87) PCT Pub. No.: WO01/96816

PCT Pub. Date: Dec. 20, 2001

(51) Int. Cl.$^7$ ............................................. H01J 40/14
(52) U.S. Cl. ...................................... 250/221; 250/239
(58) Field of Search ................................. 250/221, 239, 250/235, 216, 551

(56) References Cited

U.S. PATENT DOCUMENTS 3,983,391 A     9/1976  Clemons
5,821,551 A *  10/1998  Roh ........................ 250/559.4
5,844,673 A    12/1998  Ivers
6,765,196 B2 *  7/2004  Schulz et al. ............... 250/239

FOREIGN PATENT DOCUMENTS

| EP | 0140574 A | 5/1985 |
| EP | 0685708 A | 12/1995 |
| GB | 2005407 A | 4/1979 |
| JP | 61-132812 A | 6/1986 |

* cited by examiner

*Primary Examiner*—Que T. Le
(74) *Attorney, Agent, or Firm*—Banner & Witcoff, Ltd.

(57) ABSTRACT

A position detector for a scanning device includes a movable light blocker, at least two light detectors which are located behind the light blocker and which can be covered by the light blocker at different extents of coverage as the light blocker is being moved, so that the position of the light blocker can be determined, and at least one light source for emitting light onto the light detectors. A reflector is provided which is located in front of the light blocker. The light source is arranged such that the light emitted therefrom is emitted onto the reflector. Furthermore, the reflector is arranged such that the light impinging thereon is reflected onto the light detectors.

17 Claims, 2 Drawing Sheets

POSITION DETECTOR FOR A SCANNING DEVICE

CROSS REFERENCE TO RELATED APPLICATIONS

This is a U.S. National Phase Application under 35 U.S.C. § 371 and applicant herewith claims the benefit of priority of PCT/EP00/05528 filed Jun. 15, 2000, which was published Under PCT Article 21(2) in English, the entire contents of which are incorporated herein by reference.

FIELD OF THE INVENTION

The present invention relates to a position detector, in particular to an optical position detector, for a scanning device and to a scanning device comprising the position detector according to the present invention.

BACKGROUND OF THE INVENTION

Nowadays, precise determining of spatial positions is, in particular due to an increasing extent of automatisation in fabrication and processing methods, an important prerequisite for an efficient fabrication and processing of low tolerance structural members. A precise control of the beam trajectory of intense laser light is required for e.g. in laser beam material processing. Optical scanners, so-called galvanometers, are often used for this purpose. Among these are e.g. galvanometers comprising a rotatably arranged shaft to which a mirror is fixed, wherein the shaft is rotationally driven by a motor to spatially vary the beam trajectory of a laser beam impinging upon the mirror. An arrangement of two such galvanometers in series enables a two-dimensional deflection of laser light. An exact control of the beam trajectory requires a control mechanism which exactly determines the current angle of rotation of the shaft and, in case when said determined angle of rotation deviates from its set value, corrects it via a control device. The current angle of rotation is determined by means of a position detector, the output signal of which represents the control quantity.

Most optical scanners being used nowadays use so-called capacitive position detectors. In this sort of detectors the rotatably arranged shaft is coupled with an adjustable capacitor or with a dielectric arranged between the plates of the capacitor. A measurement of the capacitor's capacitance provides a quantity being connected directly to the current angle of rotation of the shaft. Capacitive position detectors as a rule provide a high angular resolution and are largely insensitive to drifting. However, the fabrication of such detectors is relatively costly and thus expensive. Further, in particular in small scanners, the detectors considerably increase the mass moment of inertia of the scanner.

For this reason, optical position detectors are increasingly used in small scanners. However, such optical position detectors had a lower angular resolution and a larger drift as compared to capacitive position detectors, so that they were used only in applications in which the demands on the exact position of the beam trajectory are not very high (e.g., laser shows). Further-developed optical position detectors achieved the required specifications in angular resolution and drift for rendering optical position detectors possible also for laser light fabrication and processing techniques that require high accuracy.

U.S. Pat. No. 5,844,673 discloses a position detector, which determines the angular position of a rotatable element, wherein the position detector comprises; a single light source directing a uniform wide angle field of light in a direction along the longitudinal axis of the rotatable element, multiple sector-shaped light detectors aligned circumferentially about the rotatable element to receive light directly from said source, and a light blocker operably connected to the rotatable element to rotate therewith about said longitudinal axis for periodically blocking portions of the light which impinge upon said light detectors from said light source. The space between the light source and the detectors is essentially free of any object, except for the light blocker, so that the light from the light source can impinge directly upon at least those portions of said detectors, which the light blocker is not blocking. I.e., the light impinges directly upon the detectors, without passing through any other object. A linear output of each of the pairs of connected detectors is utilized to provide a reliable measurement of the angular position of the rotatable element.

BRIEF DESCRIPTION OF THE INVENTION

The invention provides a position detector for a scanning device, by which an arrangement with an increased compactness and simultaneously a higher accuracy as to position detection is achievable. The invention further provides a scanning device comprising a position detector as it is described above.

The position detector according to the present invention for a scanning device comprises a movable light blocker and at least two light detectors, which are located behind the light blocker and which can be covered by the light blocker at different extents of coverage as the light blocker is being moved. From the different extents of coverage, the position of the light blocker is determined. The position detector according to the present invention further comprises at least one light source for emitting light onto the light detectors. The light source is arranged such that the light emitted therefrom is emitted onto a reflector being located in front of the light blocker, wherein the reflector is arranged such that the light impinging thereon is reflected onto the light detectors.

Since the reflector is provided, the light source can be located closer to the light detectors, by which lines, such as signal or power supply lines, can be directed directly both to the light detectors and the light source, without large detours. The reflector located in front of the light detectors can be built to have a low structural depth, so that the frontward size of the position detector is not essentially increased. Thus, a more compact structure of the position detector is allowed.

To achieve a smallest possible structural size of the position detector, the reflector is preferably constituted to have the shape of a coating applied onto a thin substrate. The substrate is advantageously a cover cap, which simultaneously seals the position detector against contaminations such as dust and water. The coating can be realized e.g. in the shape of a coat of paint or a foil. Preferably, the reflective coating is formed by a reflective varnish.

The position detector according to the present invention detects a position by comparing, e.g. subtracting from each other, the output signals of the light detectors, the latter being covered to different extents, under formation of a measuring signal having a linear dependence on the position of the light blocker.

The light source can be located e.g. at a location between the reflector and the light detectors and emits its light e.g. obliquely onto the reflector. However, the light source is preferably located sidewards of and adjacent to the light detectors.

In that the light source is located directly beside the light detectors, an especially compact structure comprising extremely short ways for the electric lines to the light source and to the light detectors is achieved.

Although also mirrors, by which the light emitted from the light source is reflected almost symmetrically to the reflector normal, can be used as the reflector, a diffuse reflector is preferably provided as the reflector, which diffuse reflector is in particular constituted as a diffusively reflecting varnish, but can also be constituted as any other reflecting coating applied to a substrate.

By the use of such a reflector, an especially uniform (homogeneous) distribution of the radiation intensity of the reflected light over the active detector surface, i.e. the detector surface not covered, is achieved in a simple way. Further, such a diffuse reflector significantly reduces the demands on the quality of the light source. Among this quality is the homogeneity of the light intensity which is emitted into the solid angle being, taking into account the light reflection by the reflector, spread by the spatial position of the light source and the active detector surface. From the homogeneity of the light intensity impinging upon the active detector surface results a high degree of linearity between the angle position to be detected and the corresponding measuring signal in the output signal. Further, by the improved homogeneity of the light intensity it is achieved that the position detector according to the present invention is very insensitive to mounting or assembling tolerances between the light source and the refelector as well as between the reflector and the detector/s. In addition, a reduced sensitivity of the position detector according to the present invention to thermal influences is achieved.

A reflection geometry is preferred for the reflector, wherein all optical elements (light sources, detectors) are arranged in one plane. This allows an advantageous assembly of said optical elements on a common printed circuit board, by which mounting, assembly and thus fabrication of the position detector are further simplified.

Advantageously, at least two light sources are provided, by which an even more homogeneous light intensity is achieved, wherein the light sources are positioned in particular symmetrically to the axes of symmetry of the light detectors arrangement.

Although the light blocker can for example also be translationally moveable over the light detectors, the light blocker is preferably arranged to be rotatable, wherein the light detectors have the shape of a section of an annulus.

The rotatable arrangement of the light blocker can be constructionally achieved in a simple way by means of a shaft, which can in comparison to a translational motion of the light source be realized more easily and precisely. By the shape of a section of an annulus of the light detectors a measuring signal can be achieved, which is linear with respect to the angular position of the light blocker. The respective light detector's shape of a section of an annulus can be achieved e.g. by the use of a light sensitive element having the shape of a section of an annulus as the light detector. However, the light detector advantageously comprises any light sensitive element, e.g. a conventional circular or rectangular photodiode, which is provided with a mask comprising a recess having the shape of a section of an annulus. Herewith, a light detector of the shape of a section of an annulus is achieved in an especially inexpensive way. Preferably, the respective light detector comprises a light sensitive element, wherein a common mask is provided for at least several of the light detectors, which mask is provided with a corresponding number of recesses having the shape of a section of an annulus, whereby the corresponding light detector's shape of a section of an annulus is formed. Particularly preferably only a single mask is provided, with a number of recesses therein, each having the shape of a section of an annulus, which number corresponds to the number of light detectors. By this the detector surfaces are mutually adjusted with an higher accuracy.

According to a preferred embodiment at least four light detectors are provided, which are arranged around the rotational axis of the rotatably arranged light blocker such that respectively two light detectors which are arranged diametrically opposite to each other experience essentially the same coverage by the light blocker. With such a light detector arrangement, an unwanted variation of the radial position of the light blocker can be detected and compensated in a simple fashion, since the light detectors being arranged in a mutually diametrical fashion with respect to the rotational axis of the light blocker experience the same amount of change regarding the covered surfaces. In the case that more than four light detectors are provided their number also corresponds to an even number. With more than four light detectors, thus e.g. with six or eight light detectors, a higher signal yield is achieved, so that the detector signals need to be amplified only slightly, by which a fast signal processing and thus a faster operating detector can be realized.

According to an embodiment of the invention respectively two adjacent light detectors are formed as a slit diode, such that the overall light detector arrangement can be realized in an inexpensive and space-saving way.

To achieve a measuring signal, which is insensitive to changes of the radial position of the light blocker, which can be e.g. due to thermal influences or assembling tolerances, preferably a control device being connected to the light detectors is provided, which control device has the following structure: The signals output from the light detectors respectively having the same extent of coverage are added, and then the difference of these two sum signals is formed. The difference signal then is an output signal which is proportional to the position of the light blocker.

According to a further embodiment of the present invention a control unit is provided, which is constituted such that the signals output from the light detectors are added, thereby forming an overall addition signal and that the radiation intensity of the light source(s) is controlled in accordance with the overall addition signal. By means of this control unit variations in the emitted radiation intensity from the light source(s) being caused by e.g. aging or thermal influences can be compensated.

The position detector can be utilized e.g. for measuring any rotational motion or also translational motion. With the help of a corresponding electronic circuit also angular frequencies can be measured, and hence the position detector according to the present invention can be utilized as a revolution counter.

According to an embodiment of the invention a scanning device comprising the position detector according to the present invention is provided. In this case e.g. coupled to the light blocker can be a mirror, onto which a laser beam is directed and by the motion, in particular rotation, of which the laser beam is deflected. In this case the mirror is coupled to the light blocker such that its motion leads to a motion of the light blocker being proportional thereto, in particular corresponding thereto (same kind of motion), so that the position of the mirror can be detected by means of the position detector being coupled thereto. The scanning device can be used for example for inscribing parts, wherein the laser beam is guided by a controlled motion of the mirror and burns in a prescribed print image into the part to be inscribed. The scanning device can also be used in medical technology, e.g. for removal of skin irritations such as wrinkles and tattoos, which are removed by the exactly guided laser beam.

BRIEF DESCRIPTION OF THE DRAWINGS

In the following, the invention will be described by means of a preferred embodiment and referring to the drawings. In the drawings.

DETAILED DESCRIPTION OF THE INVENTION

Figure 1:
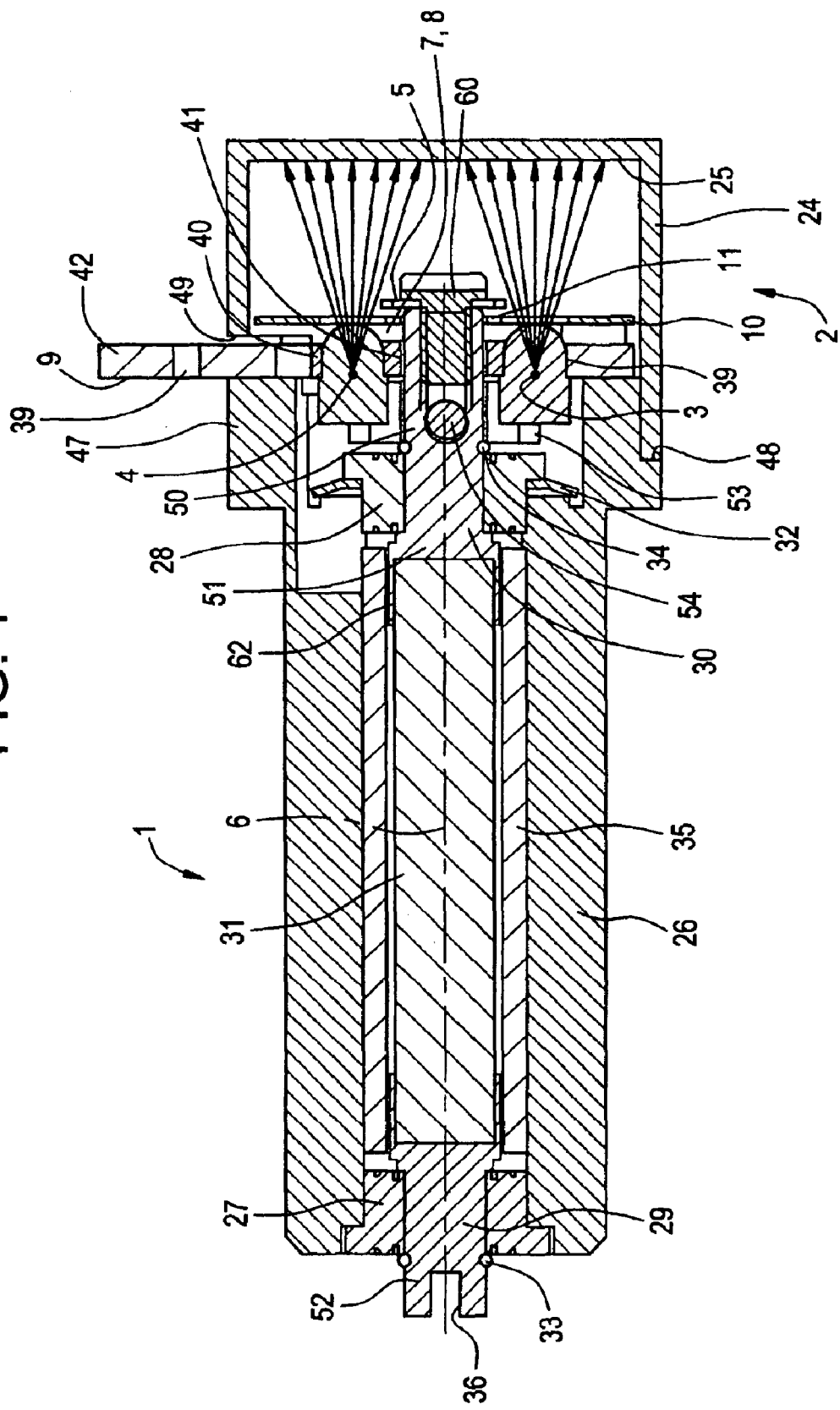
FIG. 1 shows a longitudinal section of of a scanning device comprising a position detector according to an embodiment of the invention.
Figure 2:
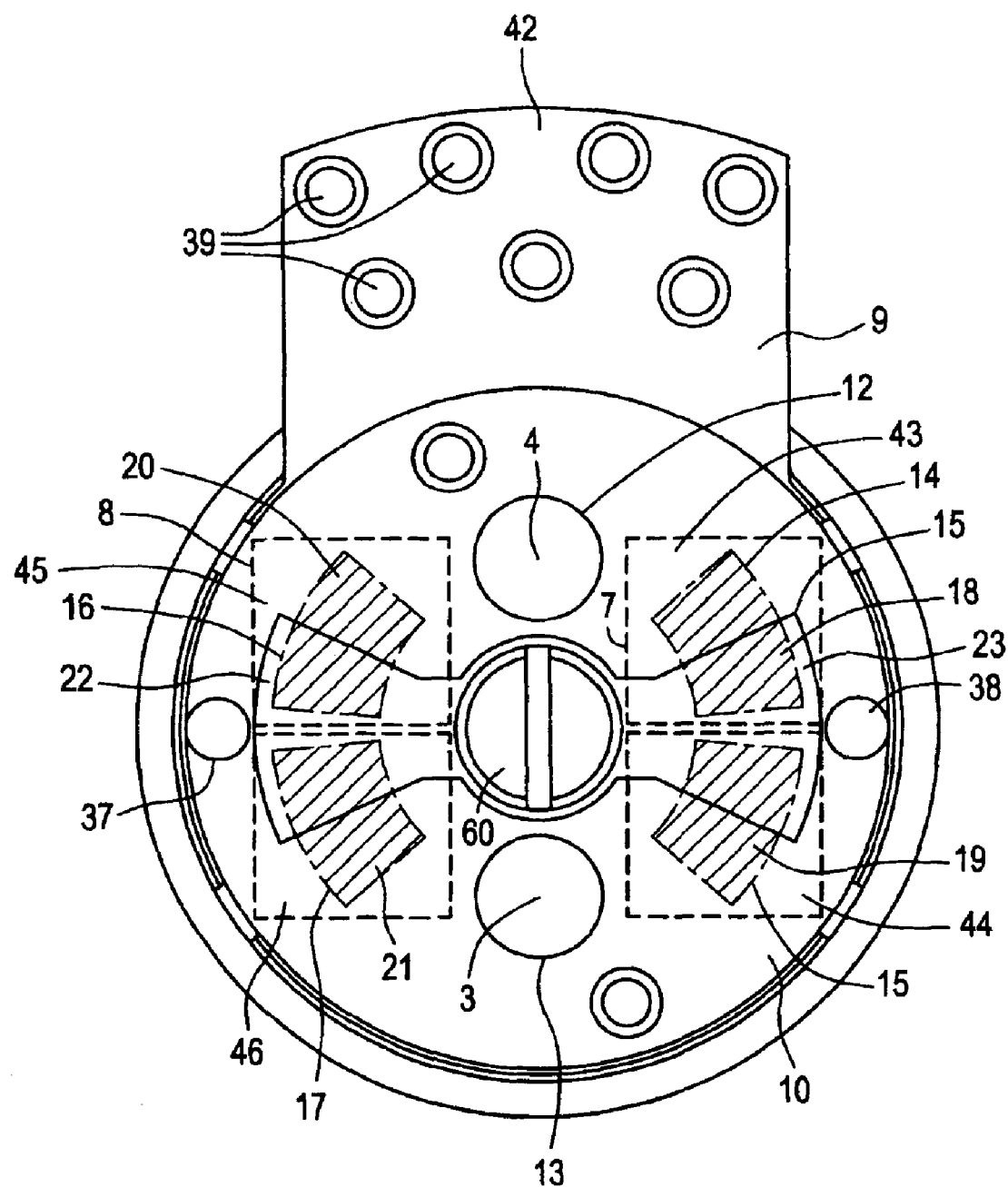
FIG. 2 shows a front view of the scanning device of FIG. 1, wherein the front cover has been removed.

As is shown in FIG. 1 and FIG. 2, a scanning device 1 according to the present invention comprises a position detector 2 being arranged at its front side. The position detector 2 is constituted as an optical position detector. The optical position detector 2 comprises two light sources 3, 4 being located behind a light blocker 5, which in turn is tightly connected to a rotationally arranged shaft 6 extending backwards between the two light sources 3, 4. Thus the light blocker 5 is rotated along with the rotation of the shaft 6. The light sources 3, 4 are arranged symmetrically with respect to the longitudinal axis of the shaft 6. Preferably, a light emitting diode (LED) is used as the respective light source 3, 4; however, other lamps are possible as well.

Directly laterally beside the light sources 3, 4, a detector arrangement comprising four light detectors 18, 19, 20, 21 is located in a plane extending vertically to the longitudinal axis of the shaft 6. These four light detectors 18, 19, 20, 21 are arranged symmetrically with respect to the shaft 6, wherein respectively two light detectors 18, 21 and 19, 20, respectively, are arranged diametrical with respect to each other. Respectively two mutually adjacent light detectors 18, 19 and 20, 21, respectively, are constituted by an assigned slit diode 7 and 8, respectively, wherein the mounting of a compact arrangement comprising the four detectors is enabled. The light detectors 18, 19, 20, 21, i.e. in this case the slit diodes 7, 8 and the light sources 3, 4 are arranged adjacent to each other such that no light emitted from the light sources 3, 4 can directly impinge upon light detectors 18, 19, 20, 21, i.e. upon their light sensitive sides. In addition, the light detectors 18, 19, 20, 21 and the light sources 3, 4 are arranged on a common printed circuit board 9 in a compact fashion.

The printed circuit board 9 comprises lead through openings 39, 40, into which the two light sources 3, 4 are inserted, so that they emit light in a forward direction from the printed circuit board 9. The printed circuit board 9 comprises an opening 41 being formed to be concentrical to the shaft 6, through which the shaft 6 is guided in a forward direction.

Further, two fixing holes 37, 38 being located mutually diametrically are formed in the printed circuit board 9, by means of which holes the printed circuit board 9 can be fixed to a scanner housing, e.g. via screws. An integral projection 42 of the printed circuit board laterally extends outwards from the light sources 3, 4. Several lead through holes 39, being provided for soldering tags, which allow an easy and secure eletrical contacting of the scanner device 1 and of the optical position detector 2, are formed in said projection 42.

A mask 10 having several recesses is located directly in front of the slit diodes 7, 8 and the light sources 3, 4. The shaft 6 extends through a first circular recess 11 located in the center of the mask 10. Two further recesses 12, 13, which are also circular, are located in the mask 10 directly in front of the light sources 3, 4 and are arranged essentially concentrically with respect to their cone of light.

The respective slit diode 7, 8 comprises two light sensitive elements 43, 44 and 45, 46, respectively, which are separated from each other by a slit and which are of rectangular shape. Other shapes of light elements can also be used, such as circular light sensitive elements. The mask 10 comprises four recesses 14, 15, 16, 17 which are arranged directly in front of the respective light sensitive elements 43, 44, 45 and 46, respectively. Each of these recesses 14, 15, 16, 17 has the shape of a section of an annulus, the center of the corresponding circle being located in the longitudinal axis of the shaft 6. The light sensitive elements of the slit diodes 7, 8, together with the mask 10 located in front of them and the recesses 14, 15, 16, 17 therein, form active detector surfaces 18, 19, 20, 21, which have the shape of sections of an annulus and are arranged symmetrically around the longitudinal axis of the shaft 6, the two active surfaces 18 and 21 as well as 19 and 20, respectively, being arranged diametrically with respect to each other.

The light blocker 5 connected to the rotatably arranged shaft 6 is fixed to the shaft 6 by means of a screw 60. For this purpose, the screw 60 is screwed into the front side of the shaft 6 in a central position, so that the light blocker 5, which has the shape of a flat plate, is pinched between the front side of the shaft 6 and the head of the screw 60. The light blocker 5 comprises two blades 22, 23 facing each other with respect to the longitudinal axis of shaft 6. Apart from the portion which serves to fix the light blocker 5 to the shaft 6, the blades 22, 23 have the shape of a sector of a circle, the center of the corresponding circle being located in the rotational axis of the shaft 6.

At its front side the position detector 2 comprises a pot-like cover 24, a reflector 25 being arranged on the inside of its ground surface. The surface of this reflector 25 is such that light impinging on it will be reflected diffusely. In order to build the position detector 2 as small as possible, the reflector 25 is preferably provided in the form of a coating. This coating can be realized e. g. by using a diffusely reflective varnish, which cannot only be applied to the inside of the ground surface, but also—according to an embodiment of the invention—to the inner circumferential surface of the pot-like cover.

The scanning device 1 coupled with the position detector 2 further comprises a cylindrical, elongated housing 26 which extends backwards in its longitudinal direction with respect to the position detector 2 located at the front. At its front side the housing 26 comprises an outwardly protruding annular flange 47 which, at its frontal end portion, is provided with a recess extending in its circumferential direction. The cover 24 lies flush in the recess and can thus be mounted circumferentially flush to the housing 26, whereby the cover may be stopped by a stop shoulder 48 formed by the recess. The printed circuit board 9 extends out of the housing toward the outside, closely fitted to the front side of the housing 26, a corresponding recess 49 being formed in the cover for this purpose. At the side opposite to this through-hole the printed circuit board 9 is also closely fitted to the front side of the housing 26, so that on the whole it is safely supported by the housing 26.

In the front and rear end portion of the housing 26, respectively a sliding bearing bushing 27, 28 is inserted which supports the shaft 6. Instead of sliding bearings, roll bearings can also be provided to support the shaft 6.

The shaft 6 is composed of three separate shaft portions 29, 30 and 31. The middle portion of the shaft is formed by a cylindrical elongated permanent magnet 31. A front portion 30 of the shaft is supported by the front sliding bearing bushing 28 and extends to the front through the printed circuit board 9, the light blocker 5 being mounted on its free front end 50, as described above. The rear end portion 51 of the front portion 30 of the shaft has the shape of a receiving bushing 62, in which the permanent magnet 31 is supported in such a fashion that relative rotation therebetween is prevented. The rear portion 29 of the shaft is supported by the rear sliding bearing bushing 27 and extends through the rear sliding bearing bushing 27. An end portion 52 of the rear portion 29 of the shaft comprises a slit-like holding device 36, in which a mirror (not depicted) can be fixed. The mirror is fixed in the slit-like holding device 36 in such a fashion that it performs the same rotary motion as the shaft 6. The mirror serves to change the beam trajectory of laser light in a predetermined way.

A flat spring 32 is arranged between the bearing 28 and the housing 26, so that a slight initial tension is produced which is transmitted to the shaft 6 by means of supporting rings 33 and 34. The supporting rings 33 and 34 fix the inner bushings of the sliding bearings 27 and 28 in the portions 29 and 30 of the shaft. Thus, by means of the flat spring 32 a force acts on the shaft 6 via the sliding bearing 28 towards the front, which pushes the rear sliding bearing 27 onto the seat of the bearing within the housing 26.

This ensures a precise rotation of the shaft 6, so that a high accuracy of the position detector 2 with respect to the detection of positions is achieved.

Coils 35 are arranged between the housing 26 and the permanent magnet 31, the coils forming an electric motor together with the permanent magnet 31. By means of the electric motor the shaft 6 is made to rotate.

For scanning a surface by means of two scanning devices 1 connected in series the electric motor can e. g. perform reversing, periodical or any controlled rotational movements, so that the mirror (not depicted) fixed to the holding device 36 directs a laser beam to a corresponding point of an authoritative surface. In order to limit the rotational angles of the shaft 6, four stoppers 53, preferably rubber stoppers, are arranged at the sides of the portion 30 of the shaft 6. A threaded rod 54 is screwed into the shaft portion 30 transversely to the longitudinal direction of the shaft and extending through the shaft 6. Thus, in case of an excessive rotational angle the threaded rod 54, which comprises opposite end portions projecting from the shaft 6 (not depicted), hits the stoppers 53 with these end portions, so that excessive turning of the shaft 6 is avoided.

In the following the detection of a position by means of the optical position detector 2 will be described. Light is emitted by the light emitting diodes 3, 4 in the direction of the diffuse reflector 25. The light is reflected by the diffuse reflector 25 and, with an essentially homogeneous intensity, impinges upon the arrangement of the four active detector surfaces 18, 19, 20, 21 having the shape of a section of an annulus. Depending on the angular position of the shaft 6 the individual active detector surfaces 18, 19, 20, 21 are reduced more or less by the light blocker 5, additionally depending on the degree of coverage. Thus, the integral light intensity which is reflected by the reflector 25 and impinges upon the individual active detector surfaces 18, 19, 20, 21 also depends on the angular position of the light blocker 5. When the optical elements and the light blocker 5 are adjusted symmetrically, two of the detector surfaces 18, 19, 20, 21 arranged diametrically with respect to each other are covered by the light blocker 5 to the same extent. The detectors are operated in a linear working area, i. e. the output signal generated by one detector is directly proportional to the integral light intensity impinging upon the respective detector surface. Thus, the electric output signal has a linear dependence on the active detector surfaces 18, 19, 20 or 21 not covered by the light blocker 5, which in turn has a linear dependence on the angular position of the light blocker 5 attached to the shaft 6.

The output signals of the detector are processed electronically in such a fashion that first the output signals of two detectors 18 and 21 or 19 and 20, respectively, which are arranged diametrically, are added, so that two sum signals are generated. Subsequently, the two sum signals are subtracted. The resulting difference signal is a direct measure for the current angular position of the shaft 6. Furthermore, the output signals of all detectors 18, 19, 20, 21 are added, so that an overall sum signal is generated. This overall sum signal is used in a so-called AGC circuit (automatic gain control circuit) in order to control the intensity of the light emitted by the light sources 3, 4 and thus to reduce drifts.

What is claimed is:

1. Position detector for a scanning device comprising: a single movable light blocker; at least two light detectors located behind the light blocker, wherein the light detectors can be covered by the light blocker at different extents of coverage as the light blocker is being moved, from which different extents of coverage a position of the light blocker can be determined; and at least one light source for emitting light onto the light detectors, wherein a reflector is provided in front of the light blocker, and the light source is arranged such that the light emitted therefrom is emitted onto the reflector, and wherein the reflector is arranged such that the light impinging thereon is reflected onto the light detectors.

2. Position detector according to claim 1, wherein the light source is arranged sidewards of and adjacent to the light detectors.

3. Position detector according to claim 1, wherein the reflector is a diffuse reflector.

4. Position detector according to claim 1, wherein the reflector comprises a reflecting varnish.

5. Position detector according to claim 1, wherein the reflector is provided in the form of a coating applied to a substrate.

6. Position detector according to claim 5, wherein the substrate is a cover by which the position detector is closed and sealed toward the front.

7. Position detector according to claim 1, wherein at least two light sources are provided.

8. Position detector according to claim 1, wherein the light blocker is arranged rotatably, and wherein each of the light detectors has a shape of a section of an annulus.

9. Position detector according to claim 8, wherein at least four light detectors are provided, wherein the light detectors are arranged around a rotational axis of the light blocker in such a fashion that respectively two light detectors arranged diametrically with respect to each other are covered essentially to the same extent by the light blocker.

10. Position detector according to claim 8, wherein each light detector comprises a light sensitive element which is provided with a mask comprising a recess having a shape of a section of an annulus, by which the corresponding light detector's shape of the section of the annulus is formed.

11. Position detector according to claim 8, wherein each light detector comprises a light sensitive element, and wherein a common mask is provided for at least a plurality of the light detectors, the mask being provided with a corresponding number of recesses having a shape of a section of an annulus, by which the corresponding light detector's shape of the section of the annulus is formed.

12. Position detector according to claim 9, wherein the light detectors are connected to a control device which has a structure such that output signals of the two light detectors, respectively having the same extent of coverage, are added, thereby calculating two addition signals, and such that a difference of the two addition signals is formed, thereby generating a linear output signal proportional to a position of the light blocker.

13. Position detector according to claim 1, wherein two adjacent light detectors are formed as a slit diode.

14. Position detector according to claim 1, wherein a control unit is provided which has a structure such that output signals of the light detectors are added, thereby generating an overall addition signal, and such that an intensity of radiation of the light source(s) is controlled in accordance with the overall addition signal.

15. Position detector according to claim 1, wherein the light detectors and the light source(s) are essentially arranged in one plane.

16. Position detector according to claim 1, wherein the light detectors and the light source(s) are arranged on a common printed circuit board.

17. Scanning device comprising a position detector according to claim 1.

* * * * *